US009694998B2

United States Patent
Lee

(10) Patent No.: US 9,694,998 B2
(45) Date of Patent: Jul. 4, 2017

(54) IMAGE READING APPARATUS AND MULTI-FUNCTION APPARATUS HAVING THE SAME

(71) Applicant: SAMSUNG ELECTRONICS CO., LTD., Suwon-si, Gyeonggi-do (KR)

(72) Inventor: Jung Hoon Lee, Suwon-si (KR)

(73) Assignee: S-PRINTING SOLUTION CO., LTD., Suwon-si (KR)

(*) Notice: Subject to any disclaimer, the term of this patent is extended or adjusted under 35 U.S.C. 154(b) by 0 days.

(21) Appl. No.: 14/716,133

(22) Filed: May 19, 2015

(65) Prior Publication Data

US 2015/0336756 A1 Nov. 26, 2015

(30) Foreign Application Priority Data

May 22, 2014 (KR) .................. 10-2014-0061866

(51) Int. Cl.
*B65H 1/04* (2006.01)
*B65H 3/06* (2006.01)
(Continued)

(52) U.S. Cl.
CPC ............ *B65H 3/0684* (2013.01); *B65H 1/04* (2013.01); *B65H 1/08* (2013.01); *B65H 1/266* (2013.01);
(Continued)

(58) Field of Classification Search
CPC .. B65H 1/04; B65H 2511/10; B65H 2511/12; B65H 2405/11162; B65H 2405/1116;
(Continued)

(56) References Cited

U.S. PATENT DOCUMENTS 5,839,047 A * 11/1998 Hirabayashi ............. B65H 1/04
271/171
5,887,866 A * 3/1999 Yamauchi ............ B65H 3/0669
271/116
(Continued)

FOREIGN PATENT DOCUMENTS

| JP | 08091641 A * | 4/1996 |
|---|---|---|
| JP | 2001139156 A * | 5/2001 |
| JP | 2004142870 A * | 5/2004 |
| JP | 2005-225645 | 8/2005 |
| JP | 2005-347940 | 12/2005 |
| JP | 2007251479 A * | 9/2007 |

(Continued)

OTHER PUBLICATIONS

Extended European Search Report mailed Oct. 27, 2015 in related European Application No. 15166069.3.

*Primary Examiner* — Luis A Gonzalez
(74) *Attorney, Agent, or Firm* — Staas & Halsey LLP

(57) ABSTRACT

An image reading apparatus includes a document tray, and an automatic document feeding unit disposed at an upper side of the document tray to transport documents as to pass through the upper side of the document tray. The automatic document feeding unit includes a body; a document supplying tray having a first width corresponding to a width of a first document to be scanned and at which the first document to be scanned is loaded; and an auxiliary guide having a second width that is smaller than the first width to correspond to a second document having a width smaller than the width of the first document and is installed at the document supplying tray. The auxiliary guide includes a guide portion to support both widthwise sides of the document to be scanned while entered toward an upper side of the mounting unit.

17 Claims, 10 Drawing Sheets

(51) Int. Cl.
  *B65H 1/08* (2006.01)
  *B65H 9/04* (2006.01)
  *B65H 7/10* (2006.01)
  *B65H 1/26* (2006.01)
  *H04N 1/00* (2006.01)
  *H04N 1/23* (2006.01)

(52) U.S. Cl.
  CPC .............. *B65H 7/10* (2013.01); *B65H 9/04* (2013.01); *H04N 1/0066* (2013.01); *H04N 1/00551* (2013.01); *H04N 1/00567* (2013.01); *H04N 1/00604* (2013.01); *H04N 1/00623* (2013.01); *H04N 1/2323* (2013.01); *B65H 2511/10* (2013.01); *B65H 2511/12* (2013.01)

(58) Field of Classification Search
  CPC .... B65H 2405/1134; B65H 2405/1136; B65H 2405/114; B65H 2405/11425; B65H 2405/3321
  See application file for complete search history.

(56) References Cited

U.S. PATENT DOCUMENTS

| | | | |
|---|---|---|---|
| 6,179,499 B1 | 1/2001 | Beretta et al. | |
| 7,290,762 B2* | 11/2007 | Connors | B65H 3/0661 271/145 |
| 8,265,540 B2* | 9/2012 | Harada | G03G 15/605 358/474 |
| 2003/0047862 A1* | 3/2003 | Komatsu | B65H 5/062 271/10.01 |
| 2012/0119432 A1* | 5/2012 | Kambayashi | B65H 3/0607 271/10.02 |
| 2013/0056925 A1 | 3/2013 | Hsu | |

FOREIGN PATENT DOCUMENTS

| | | |
|---|---|---|
| JP | 2010052871 A * | 3/2010 |
| JP | 2010-235258 | 10/2010 |
| WO | 2013/084025 A1 | 6/2013 |

* cited by examiner

IMAGE READING APPARATUS AND MULTI-FUNCTION APPARATUS HAVING THE SAME

CROSS-REFERENCE TO RELATED APPLICATIONS

This application claims the benefit of the Korean Patent Application No. 10-2014-0061866, filed on May 22, 2014, in the Korean Intellectual Property Office, the disclosure of which is incorporated herein by reference.

BACKGROUND

1. Field

Embodiments of the present disclosure relate to an image reading apparatus and a multi-function apparatus having the same.

2. Description of the Related Art

In general, a multi-function apparatus includes an image forming apparatus to form images on a printing medium and an image reading apparatus to scan image information of documents.

The image reading apparatus includes a document tray at which the documents are placed, an automatic document feeding unit to automatically move the documents while disposed at an upper side of the document tray, and a scanner module to scan image information of the document.

With respect to the image reading apparatus, an image reading apparatus has been developed having a first scanner module to scan the image information on one side of the document while disposed at an inside the document tray and a second scanner module to scan the information on the other side of the document while included at an inside the automatic document feeding unit.

In a case of the image reading apparatus employed with the structure above, the image information on both sides of the document may be simultaneously scanned while moving the document one time in a single direction, and thus scanning may be completed within a shorter period of time.

SUMMARY

Therefore, it is an aspect of the present disclosure to provide an image reading apparatus configured to scan smaller documents, and a multi-function apparatus having the same.

It is another aspect of the present disclosure to provide an image reading apparatus capable of reducing difficulties of aligning documents that may occur when transporting a document that is smaller than a document generally used.

Additional aspects of the disclosure will be set forth in part in the description which follows and, in part, will be apparent from the description, or may be learned by practice of the disclosure.

In accordance with one aspect of the present disclosure, an image reading apparatus includes a document tray, and an automatic document feeding unit. The automatic document feeding unit may be disposed at an upper side of the document tray to transport documents to pass through the upper side of the document tray. The automatic document feeding unit may include a body; a document supplying tray having a first width corresponding to a width of a first document to be scanned and at which the first document to be scanned is loaded; and an auxiliary guide having a second width that is smaller than the first width to correspond to a second document having a width smaller than the width of the first document and installed at the document supplying tray. The body may include a pick-up roller to pick up documents to be scanned; and a mounting unit provided at a lower portion of the pick-up roller and at which front ends of the documents loaded at the document supplying tray is mounted. The auxiliary guide may include a guide portion to support widthwise both sides of the document to be scanned while entered toward an upper side of the mounting unit.

The body may include a document outlet unit provided at a lower side of the document supplying tray and at which scanned documents are loaded, and the document supplying tray may be rotatably installed at the body.

The auxiliary guide may be separably installed at the document supplying tray.

The auxiliary guide may include a loading unit at which the second document is loaded, and a pair of supporting units to support widthwise both sides of the second document while extended upward from widthwise both sides of the loading unit. The guide portion may be integrally extended from at least one of the loading unit and the pair of supporting units.

The auxiliary guide may include a coupling protrusion separably coupled to the document supplying tray while protruded from a lower surface of the loading unit.

The auxiliary guide may include a position determining member separably fixed to the loading unit, and the coupling protrusion may be formed at the position determining member.

The image reading apparatus may further include a pair of moving guides to support the widthwise both sides of the first document to be scanned while installed to be movable in the width direction of the document supplying tray, and the document supplying tray may include a pair of guide slots to guide widthwise movement of the pair of moving guides, respectively, while extended widthwise along the document supplying tray, and the coupling protrusion may include a pair of coupling protrusions separably coupled to the pair of guide slots.

The automatic document feeding unit may further include a sensor to confirm whether the auxiliary guide is installed at the document supplying tray.

The auxiliary guide may include a magnet, and the sensor may include a magnetic sensor to detect a magnetic field generated at the magnet.

The document tray may include a transparent window, and a first scanner module to scan one side of the document while disposed at a lower side of the transparent window, and the automatic document feeding unit may include a second scanner module to scan the other side of the document being transported while provided at an inside of the body.

In accordance with another aspect of the present disclosure, a multi-function apparatus includes a document tray and an automatic document feeding unit. The automatic document feeding unit may be disposed at an upper side of the document tray to transport documents to pass through the upper side of the document tray. The automatic document feeding unit may include a body; a document supplying tray having a width corresponding to a width of a document to be scanned and at which the document to be scanned is loaded; a pair of moving guides to support widthwise both sides of the document to be scanned while installed to be movable in a width direction the document supplying tray; and a pair of auxiliary guides rotatably installed at the pair of moving guides, respectively. The body may include a pick-up roller to pick up the document to be scanned; and a mounting unit provided at a lower portion of the pick-up roller, and at which front ends of the documents loaded on the document supplying tray are mounted, and the auxiliary guide may include a guide portion to support widthwise both sides of the document to be scanned while entered toward an upper side of the mounting unit.

The body may include a document outlet unit provided at a lower side of the document supplying tray and at which scanned documents are loaded, and the document supplying tray may be rotatably installed at the body.

Hinge holes may be provided at each of the pair of auxiliary guides and the pair of moving guides at corresponding positions to each other, and rivets may be penetrated and fixed to the hinge holes.

The pair of auxiliary guides may be separably installed at the pair of moving guides, respectively.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
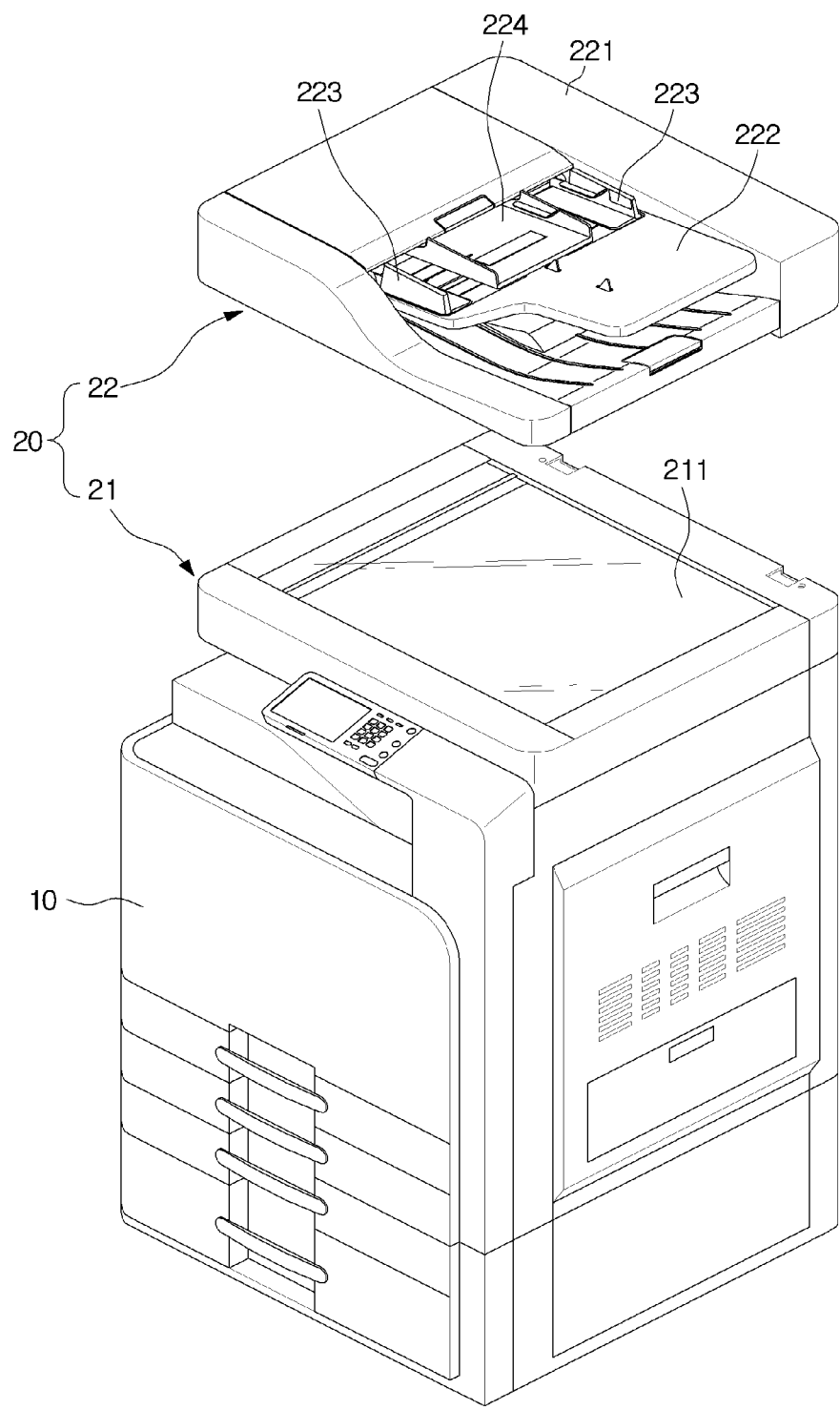
FIG. 1 is an exploded perspective view of a multi-function apparatus in accordance with a first embodiment of the present disclosure.

Reference will now be made in detail to the embodiments of the present disclosure, examples of which are illustrated in the accompanying drawings, wherein like reference numerals refer to like elements throughout.

FIG. 1 is an exploded perspective view of a multi-function apparatus in accordance with a first embodiment of the present disclosure.

As illustrated on FIG. 1, a multi-function apparatus includes an image forming apparatus 10 to form images on a printed medium, and an image reading apparatus 20 to scan documents while disposed at an upper side of the image forming apparatus 10.

Figure 2:
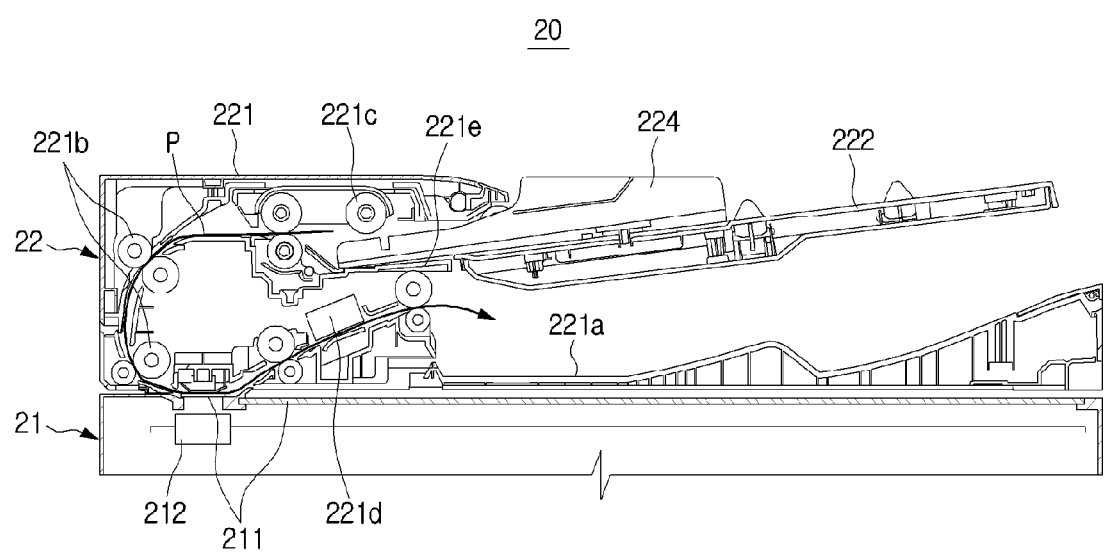
FIG. 2 is a cross-sectional view of an image reading apparatus applied at the multi-function apparatus of the first embodiment of the present disclosure.

As illustrated on FIG. 2, the image reading apparatus 20 includes a document tray 21 at which documents to be scanned is placed, and an automatic document feeding unit 22 to automatically supply the documents to be scanned while rotatably installed at an upper side of the document tray 21.

The document tray 21 includes a transparent panel 211 at which documents are placed, and a first scanner module 212 to scan one side of the document placed at an upper side of the document tray 21, that is, at an upper side of the transparent panel 211 or one side of a document passing at an upper side of the transparent panel 211 by use of the automatic document feeding unit 22.

The automatic document feeding unit 22 includes a body 221, and a document supplying tray 222 at which the document to be scanned are loaded while installed at one side of the body 221.

The body 221 includes a document outlet unit 221a at which the scanned documents are loaded, a moving path 'P' to guide the documents at the document supplying tray 222 to be transported to the document outlet unit 221a after passing through an upper side of the document tray 21, a plurality of moving rollers 221b to move the documents along the moving path 'P', a pick-up roller 221c to have the documents to enter the moving path 'P' by picking up the documents loaded at the document supplying tray 222, and a second scanner module 221d to scan the other side of the documents transported along the moving path 'P'. In addition, the body 221 is provided with a mounting unit 221e at which front ends of the documents loaded at the document supplying tray 222 are mounted, so that the front ends of the documents loaded at the document supplying tray 222 may enter toward a lower side of the pick-up roller 221c.

The document supplying tray 222 is formed as to have a first width that correspond to a first document to be scanned (in the present embodiment, the width of the document supplying tray 222 shows the width of the direction that is perpendicular with respect to the moving direction of the documents).

The document supplying tray 222 as such is rotatably installed at the body 221, so that a user may be able to easily collect the documents from the document outlet unit 221a provided at a lower side of the document supplying tray 222.

Figure 3:
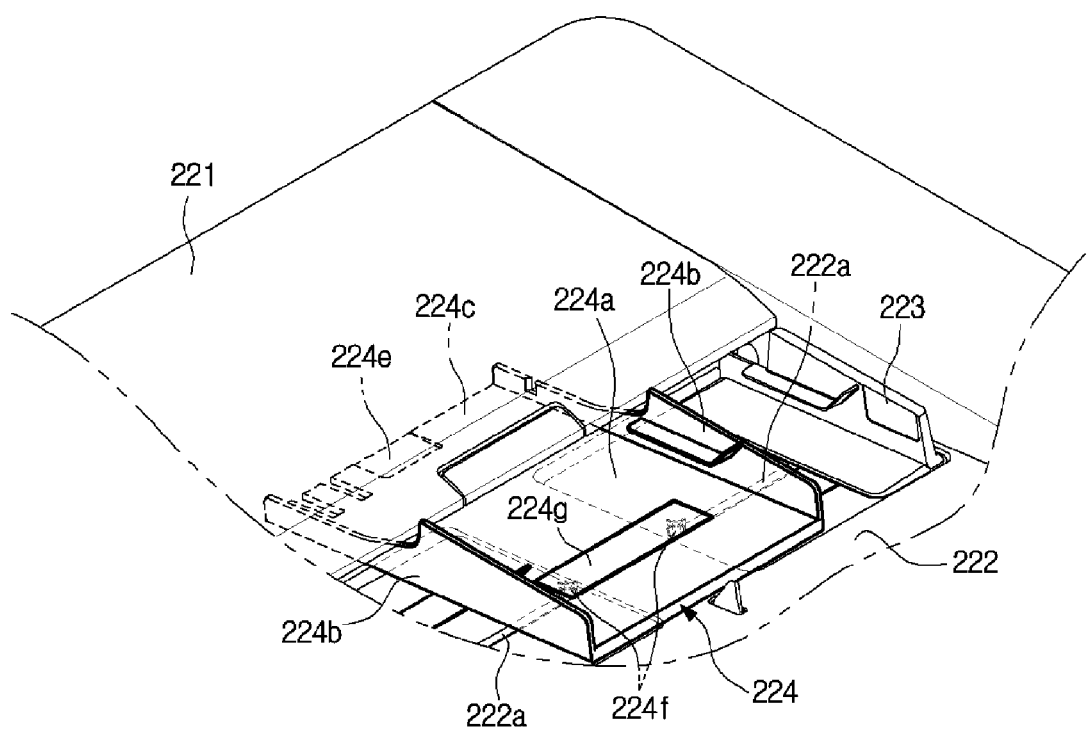
FIG. 3 is a plane view of the image reading apparatus applied at the multi-function apparatus of the first embodiment of the present disclosure.
Figure 4:
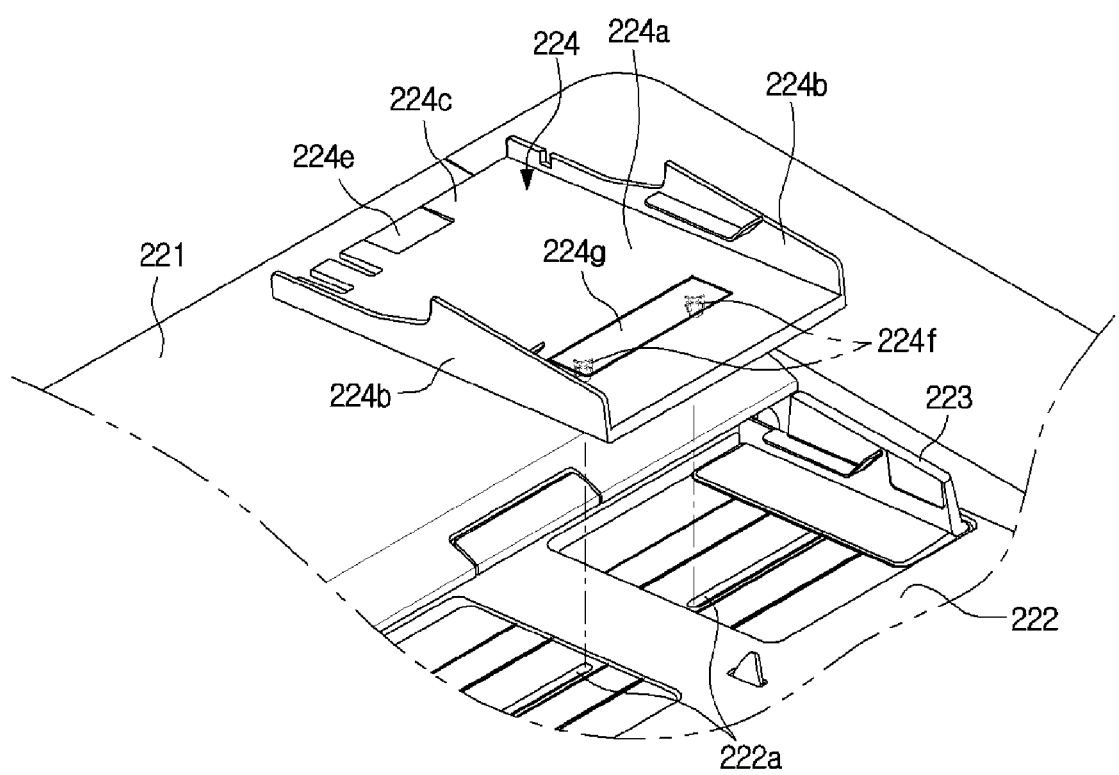
FIG. 4 is a perspective view showing a separated state of an auxiliary guide with respect to the image reading apparatus applied at the multi-function apparatus of the first embodiment of the present disclosure.

As illustrated on FIGS. 3 and 4, the automatic document feeding unit 22 includes a moving guide 223 configured to support widthwise both sides of the documents loaded at the document supplying tray 222 while installed to be movable in the width direction of the document supplying tray 222, and a pair of guide slots 222a configured to guide movements of the moving guide 223 while provided widthwise along the document supplying tray 222. In addition, although not illustrated, the two moving guides 223 are connected to two racks disposed at both sides of a single pinion, so that the two moving guides 223 may be interlockingly moved.

In addition, the image reading apparatus 20 includes an auxiliary guide 224 separably installed at the document supplying tray 222 while formed to be provided with a second width corresponding to a second document which is smaller than the first document, and is configured to scan the second document through the auxiliary guide 224, while the second document is smaller than the first document that is being generally used. In the present embodiment, the second document that may be loaded at the auxiliary guide 224 may be a document of A6 size, and the first document loaded at the document supplying tray 222 may be a document that is larger than the A6 size.

Figure 5:
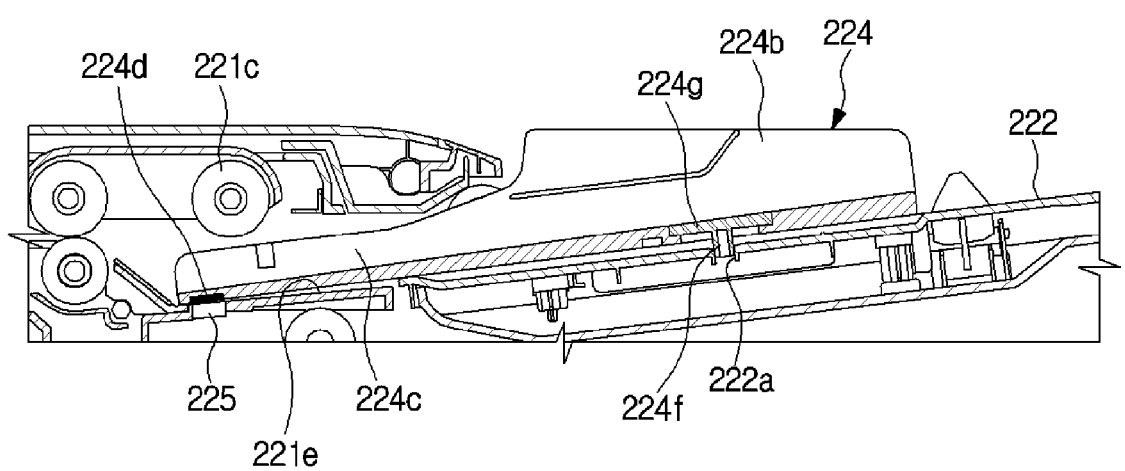
FIG. 5 is a cross-sectional view showing an installed state of the auxiliary guide with respect to the multi-function apparatus in accordance with the first embodiment of the present disclosure.

In the present embodiment, the auxiliary guide 224 includes a loading unit 224a at which the second document is loaded, a pair of supporting units 224b to support both side ends in the width direction of the second document while extended toward an upper side from the both sides of the width direction of the loading unit 224a, and a guide portion 224c to enter toward a space at an upper side of the mounting unit 221e while integrally extended from the loading unit 224a and the pair of supporting units 224b as illustrated on FIG. 5.

Thus, the second document having a smaller width with respect to the first document, which is generally used, is reached at a state of the both side ends thereof being supported through the guide portion 224c even at the space at the upper side of the mounting unit 221e, so that a difficulty of alignment of the second document that may occur in the process of the second document being picked up by use of the pick-up roller 221c may be largely reduced.

In addition, the auxiliary guide 224 is provided with a pair of coupling protrusions 224f formed while spaced apart with respect to each other toward the width directions while protruded toward a lower side from a lower surface of the loading unit 224a, and the two coupling protrusions 224f are separably coupled to the two guide slots 222a which are described earlier.

Thus, in a case of using the first document of a general size, the auxiliary guide 224 is not used by detaching the auxiliary guide 224 from the document supplying tray 222, and the auxiliary guide 224 is coupled to the document supplying tray 222 for use only in a case when scanning the second document.

Figure 6:
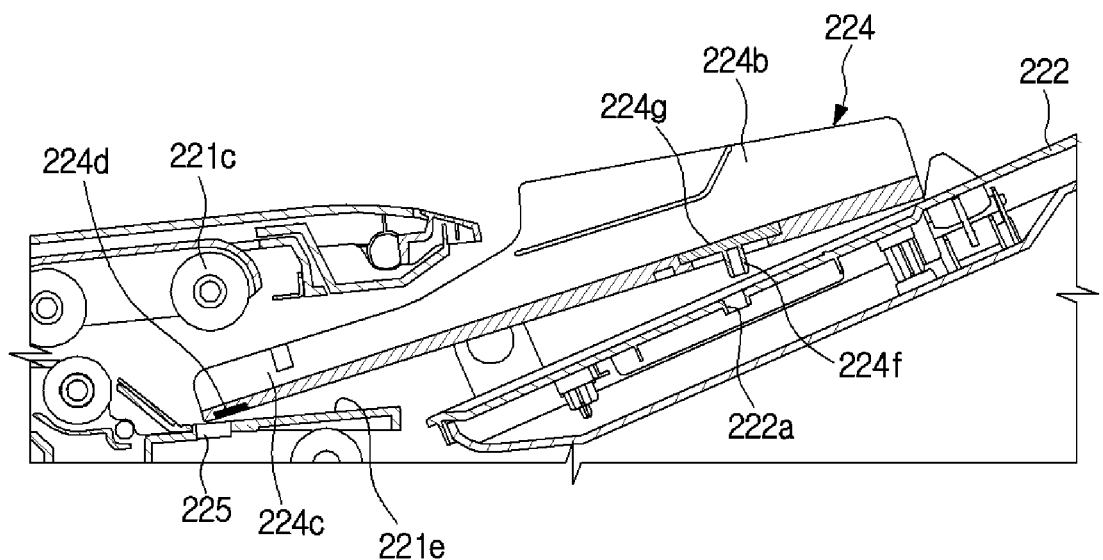
FIG. 6 is a cross-sectional view showing a rotated state of a document supplying tray with respect to the multi-function apparatus in accordance with the first embodiment of the present disclosure.

In addition, as illustrated on FIG. 5, since the auxiliary guide 224 is separably installed at the document supplying tray 222, the auxiliary guide 224 remains in a state of being coupled to the document supplying tray 222, and as illustrated on FIG. 6, in the process of rotating the document supplying tray 222, the auxiliary guide 224 is detached from the document supplying tray 222.

Figure 7:
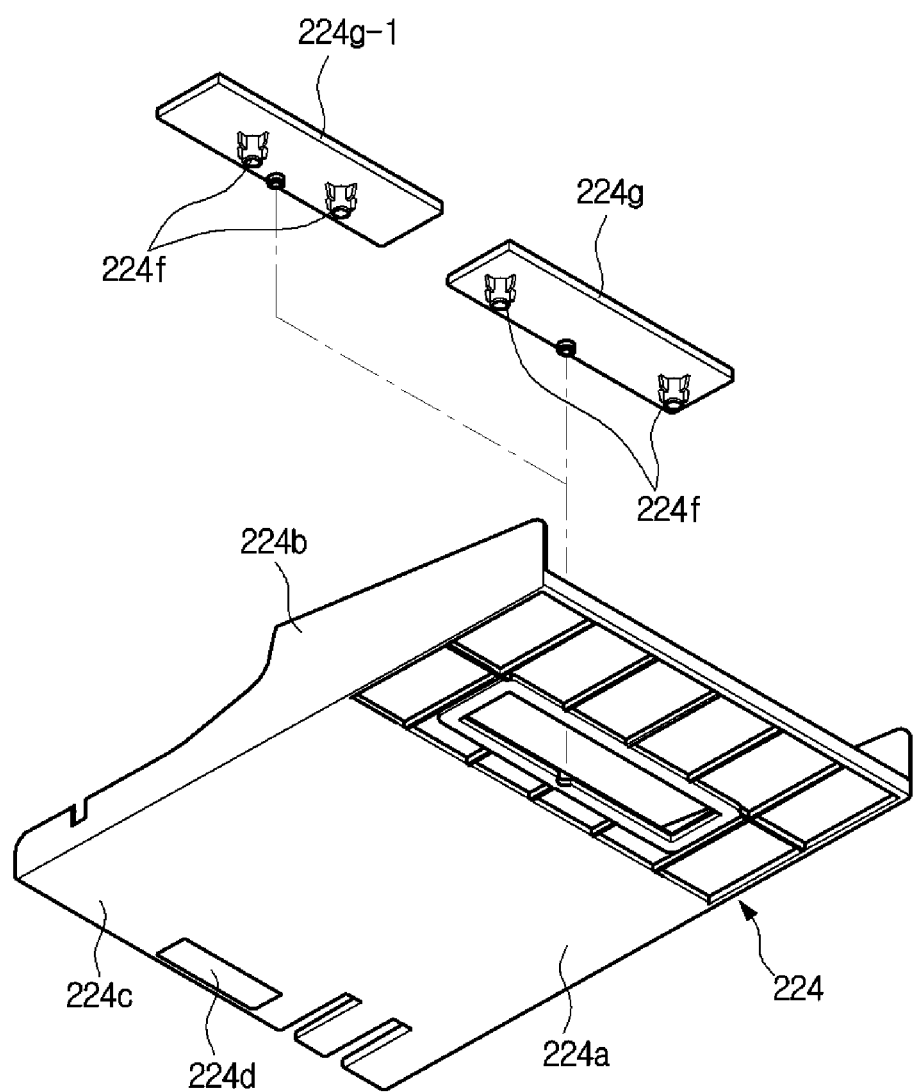
FIG. 7 is an exploded perspective view of a lower surface of the auxiliary guide with respect to the multi-function apparatus in accordance with the first embodiment of the present disclosure.

As illustrated on FIG. 7 the coupling protrusions 224f in the present embodiment are formed at a position determining member 224g separably fixed to the loading unit 224a of the auxiliary guide 224, such that the auxiliary guide 224 may be applied to a variety of versions of the image reading apparatus 20 through other several position determining members 224g and 224g-1 each having the two coupling protrusions 224f having different distances with respect to the other two coupling protrusions 224f.

As illustrated on FIG. 5, to confirm whether the auxiliary guide 224 is coupled to the document supplying tray 222, a sensor 225 configured to confirm the coupling of the auxiliary tray 222 is included at the automatic document feeding unit 222. In the present embodiment, a magnet 224d configured to generate magnetic fields is included at the auxiliary guide 224, and the sensor 225 is structured of a magnetic sensor configured to sense magnetic fields.

Thus, when the auxiliary guide 224 is installed at the document supplying tray 222, the magnetic field generated from the magnet 224d provided at the auxiliary guide 224 is detected at the magnetic sensor 225, and based on such, the installation of the auxiliary guide 224 is confirmed by use of a control unit (not shown) included at the image reading apparatus 20, and the controlling is executed accordingly.

Here, the control unit may be able to execute the controlling of remaining the image information of the domain that corresponds to the second documents among the scanned image information by use of the first scanner module 212 and the second scanner module 221d and deleting the image information from the other domains, as well as the controlling of deleting the image information from the surface at which no image remains among the both surfaces of the document.

As illustrated on FIG. 4, a friction pad 224e configured to prevent overlapped transportation of the documents is disposed at the guide portion 224c at the front end side of the auxiliary guide 224.

The two coupling protrusions 224f in the present embodiment are provided to be coupled to the guide slots 222a provided at the document supplying tray 222, but are not limited hereto, and the two coupling protrusions 224f may be coupled to coupling holes provided at the document supplying tray 222 so as to correspond to the two coupling protrusions 224f.

In addition, in the present embodiment, the guide portion 224c is integrally extended from the loading unit 224a and the pair of supporting units 224b, but is not limited hereto, and the guide portion 224c may be able to support both side ends of the document at the space at the upper side of the mounting unit 221e even when the guide portion 224c is provided to be extended only from the pair of supporting units 224b.

Hereinafter, an auxiliary guide applied at an image reading apparatus in accordance with a second embodiment of the present disclosure will be described.

Figure 8:
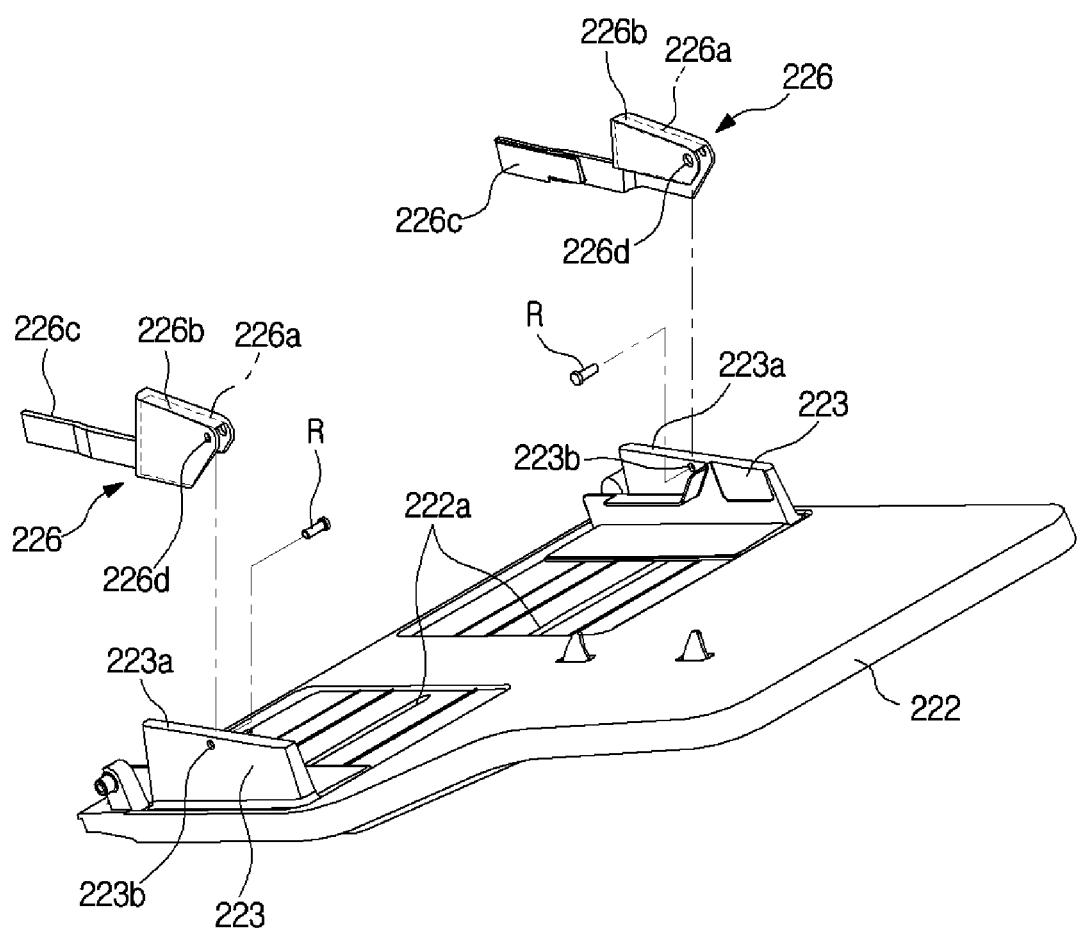
FIG. 8 is a perspective view showing an installed state of an auxiliary guide applied at a multi-function apparatus in accordance with a second embodiment of the present disclosure.

As illustrated on FIG. 8, an auxiliary guide 226 in accordance with the second embodiment of the present disclosure includes a pair of auxiliary guides 226 rotatably installed at the two moving guides 223, respectively, provided at the document supplying tray 222.

In the present embodiment, the two auxiliary guides 226 each is provided at an inside thereof with a socket unit 226b provided with a socket 226a into which an insertion unit 223a of the moving guide 223, which is to be described, is inserted, and a guide portion 226c entered toward an upper side of the mounting unit 221e while extended from the socket unit 226b.

Meanwhile, the moving guide 223 is provided with the insertion unit 223a inserted into the socket 226a while the insertion unit 223a is provided in a shape corresponding to the socket 226a.

Hinge holes 223b and 226d are provided at the two moving guides 223 and the two auxiliary guides 226 at positions corresponding to each other, and rivets R are penetratingly fixed to the hinge holes 223b and 226d such that the two auxiliary guides are rotatably installed at the two moving guides 223, respectively.

Figure 9:
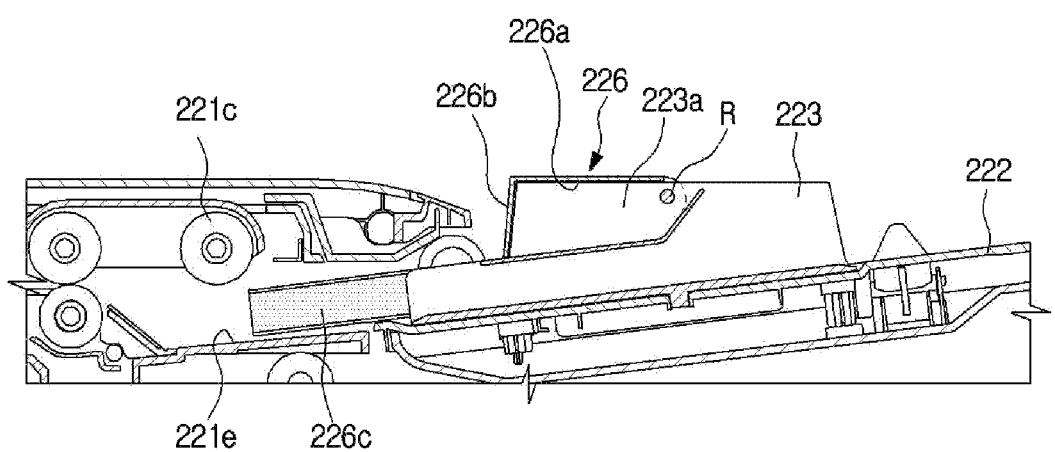
FIG. 9 is a cross-sectional view showing an installed state of the auxiliary guide with respect to the multi-function apparatus in accordance with a second embodiment of the present disclosure.

When the auxiliary guides 226 are rotatably installed at the two moving guides 223, in a case when a scanning is processing as illustrated on FIG. 9, the insertion unit 223a is inserted into an inside the socket 226a, and the guide portion 226c is provided to maintain a state of supporting the widthwise both sides of the document at the space at the upper side of the mounting unit 221e.

Figure 10:
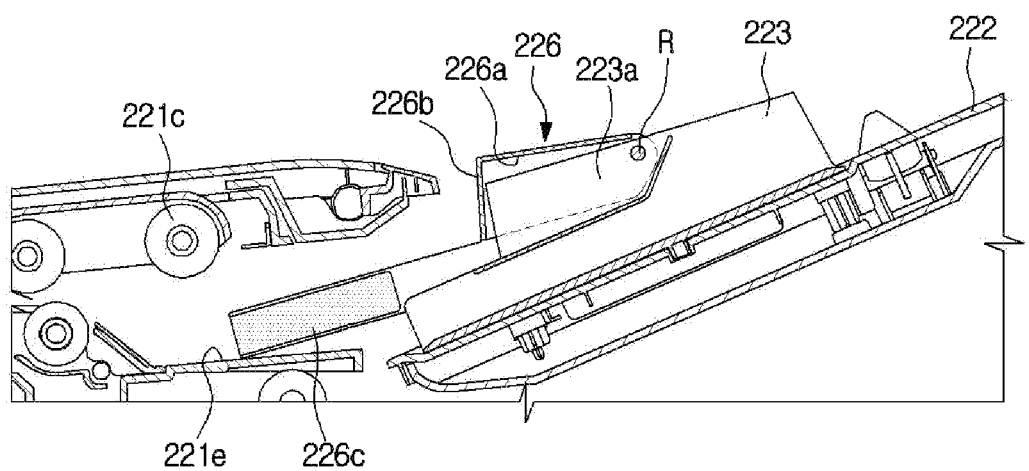
FIG. 10 is a cross-sectional view showing a rotated state of a document supplying tray with respect to the multi-function apparatus in accordance with a second embodiment of the present disclosure.

As illustrated on FIG. 10, the auxiliary guide 226 is rotatably installed at the document supplying tray 222, and thus the document supplying tray 222 may be able to be rotated even in a state of when the guide portions 226c of the auxiliary guides 226 are disposed at the space at the upper side of the mounting unit 221e.

Thus, the image reading apparatus in accordance with the second embodiment of the present disclosure is able to support both the widthwise sides of the document even at the space at the upper side of the mounting unit 221e through the guide portion 226c provided at the auxiliary guide 226, and thus the occurrence of difficulty in aligning the document may be largely reduced.

In addition, with respect to the image reading apparatus 20 in accordance with the second embodiment of the present disclosure, the auxiliary guide 226 does not need to be detached from the document supplying tray 222, and thus even in a case of using not only the second document but also the first document, which is larger than the second document, the image reading apparatus 20 may be used without detaching the auxiliary guide 226.

In the second embodiment above, the two auxiliary guides 226 are rotatably installed at the moving guides 223, but are not limited hereto, and the auxiliary guides 226 may be separably installed at the moving guides 223 by having portions of the hinge holes provided at the two moving guides 223 are partly open and by forming hinge axes separably coupled to the hinge holes at the auxiliary guides 226 and then having the hinge axes coupled to an inside the hinge holes.

In a case when scanning a document, particularly in a case when scanning a document that is smaller than an A6 document, the two auxiliary guides 226 that are provided to be detachable are configured to support both sides of the front ends of the document positioned at an inner side of the mounting unit 221e while installed at the moving guides 223, and when rotating the document supplying tray 222 as to withdraw the document from the document outlet unit 221a, the two auxiliary guides 226 are detached from the moving guides 223.

As is apparent from the above, the image reading apparatus in accordance with one aspect of the present disclosure and the multi-function apparatus having the same can scan documents having a smaller size than the originally intended size, through the auxiliary guide separably coupled to the document supplying tray of the automatic document feeding unit.

In addition, the guide portion configured to enter toward the upper side of the mounting unit at which front ends of the documents to be scanned are mounted is provided at the auxiliary guide, and thus the difficulty of aligning documents that may occur at the time of scanning further documents with respect to the documents generally being used can be reduced.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An image reading apparatus, comprising:
   a document tray; and
   an automatic document feeding unit disposed at an upper side of the document tray to transport documents to pass through the upper side of the document tray,
   wherein the automatic document feeding unit comprises a body; a document supplying tray having a first width corresponding to a width of a first document to be scanned and at which the first document to be scanned is loaded; and an auxiliary guide having a second width that is smaller than the first width to correspond to a second document having a width smaller than the width of the first document and installed at the document supplying tray,
   the body comprises a pick-up roller to pick up documents to be scanned; and a mounting unit provided at a lower portion of the pick-up roller and at which front ends of the documents loaded at the document supplying tray are mounted,
   the auxiliary guide comprises a guide portion to support both widthwise sides of the document to be scanned, the guide portion extending into the mounting unit past a leading edge of the pick-up roller,
   the document supplying tray is rotatably installed at the body,
   the auxiliary guide is separably installed at the document supplying tray, and
   the auxiliary guide is configured to be detached from the document supplying tray when rotating the document supplying tray.

2. The image reading apparatus of claim 1, wherein the body comprises a document outlet unit provided at a lower side of the document supplying tray and at which scanned documents are loaded.

3. The image reading apparatus of claim 1, wherein the auxiliary guide comprises a loading unit at which the second document is loaded, and a pair of supporting units to support both widthwise sides of the second document while extended upward from both widthwise sides of the loading unit, and
   the guide portion is integrally extended from at least one of the loading unit and the pair of supporting units.

4. The image reading apparatus of claim 3, wherein the auxiliary guide comprises a coupling protrusion separably coupled to the document supplying tray while protruded from a lower surface of the loading unit.

5. The image reading apparatus of claim 4, wherein the auxiliary guide comprises a position determining member separably fixed to the loading unit, and
   the coupling protrusion is formed at the position determining member.

6. The image reading apparatus of claim 4, further comprising:
   a pair of moving guides to support the both widthwise sides of the first document to be scanned while installed as to be movable in the width direction of the document supplying tray, and
   the document supplying tray comprises a pair of guide slots to guide widthwise movement of the pair of moving guides, respectively, while extended widthwise along the document supplying tray, and
   the coupling protrusion comprises a pair of coupling protrusions separably coupled to the pair of guide slots.

7. The image reading apparatus of claim 1, wherein the automatic document feeding unit further comprises a sensor to confirm whether the auxiliary guide is installed at the document supplying tray.

8. The image reading apparatus of claim 7, wherein the auxiliary guide comprises a magnet, and
   the sensor comprises a magnetic sensor to detect a magnetic field generated at the magnet.

9. The image reading apparatus of claim 1, wherein the document tray comprises a transparent window and a first scanner module to scan one side of the document, the first scanner module being disposed at a lower side of the transparent window, and the automatic document feeding unit comprises a second scanner module to scan the other side of the document being transported, the second scanner module being provided at an inside the body.

10. A multi-function apparatus, comprising:
a document tray; and
an automatic document feeding unit disposed at an upper side of the document tray to transport documents to pass through the upper side of the document tray,
wherein the automatic document feeding unit comprises a body; a document supplying tray having a width corresponding to a width of a document to be scanned and at which the document to be scanned is loaded; a pair of moving guides to support both widthwise sides of the document to be scanned while installed to be movable in a width direction of the document supplying tray; and a pair of auxiliary guides installed at the pair of moving guides, respectively,
the body comprises a pick-up roller to pick up the document to be scanned; and a mounting unit provided at a lower portion of the pick-up roller, and at which front ends of the documents loaded on the document supplying tray are mounted,
each of the pair of auxiliary guides comprises a guide portion to support both widthwise sides of the document to be scanned, the guide portion extending into the mounting unit past a leading edge of the pick-up roller,
the document supplying tray is rotatably installed at the body, and
the pair of auxiliary guides each include a socket unit having a socket,
the socket unit has a part adjacent to the document that is spaced apart from a side of the document supplying tray on which the document is mounted, and
the pair of moving guides each is provided with a protrusion that protrudes from a side thereof adjacent to the document such that the part of the socket unit adjacent to the document is mounted on the protrusion.

11. The multi-function apparatus of claim 10, wherein the body comprises a document outlet unit provided at a lower side of the document supplying tray and at which scanned documents are loaded.

12. The multi-function apparatus of claim 10, wherein hinge holes are provided at each of the pair of auxiliary guides and the pair of moving guides are provided at corresponding positions to each other, and rivets are penetrated and fixed to the hinge holes.

13. A document feeding unit comprising:
a body;
a document supplying tray having a first width corresponding to a width of a first document; and
an auxiliary guide installed on the document supplying tray, the auxiliary guide having a second width that is smaller than the first width to correspond to a second document having a width smaller than the width of the first document,
wherein the body comprises a pick-up roller to pick up documents and a mounting unit provided at a lower portion of the pick-up roller at which front ends of the documents loaded at the document supplying tray are mounted,
the auxiliary guide comprises a guide portion to support both widthwise sides of the document to be picked up by the pick-up roller, the guide portion extending into while entered toward an upper side of the mounting unit past a leading edge of the pick-up roller,
the auxiliary guide is removably installed on the document supplying tray,
the document supplying tray is rotatably installed at the body, and
the auxiliary guide is configured to be detached from the document supplying tray when rotating the document supplying tray.

14. The document feeding unit of claim 13, wherein the auxiliary guide comprises a loading unit at which the second document is loaded, and a pair of supporting units to support both widthwise sides of the second document while extended upward from both widthwise sides of the loading unit, and
the guide portion is integrally extended from at least one of the loading unit and the pair of supporting units.

15. The document feeding unit of claim 14, wherein the auxiliary guide comprises a coupling protrusion separably coupled to the document supplying tray while protruded from a lower surface of the loading unit.

16. The document feeding unit of claim 15, wherein the auxiliary guide comprises a position determining member separably fixed to the loading unit, and
the coupling protrusion is formed at the position determining member.

17. The document feeding unit of claim 13, further comprising a sensor to confirm whether the auxiliary guide is installed at the document supplying tray,
wherein the auxiliary guide comprises a magnet, and
the sensor comprises a magnetic sensor to detect a magnetic field generated at the magnet.

* * * * *